DOUGAL & TRUXAL.
Bee Hive.
No. 33,189. Patented Sept. 3, 1861.
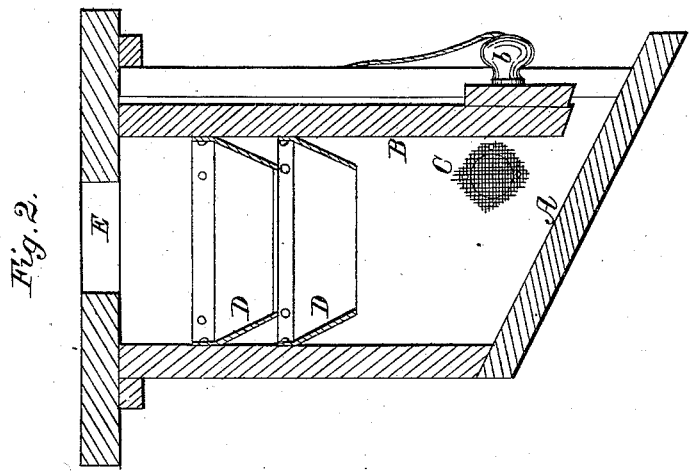
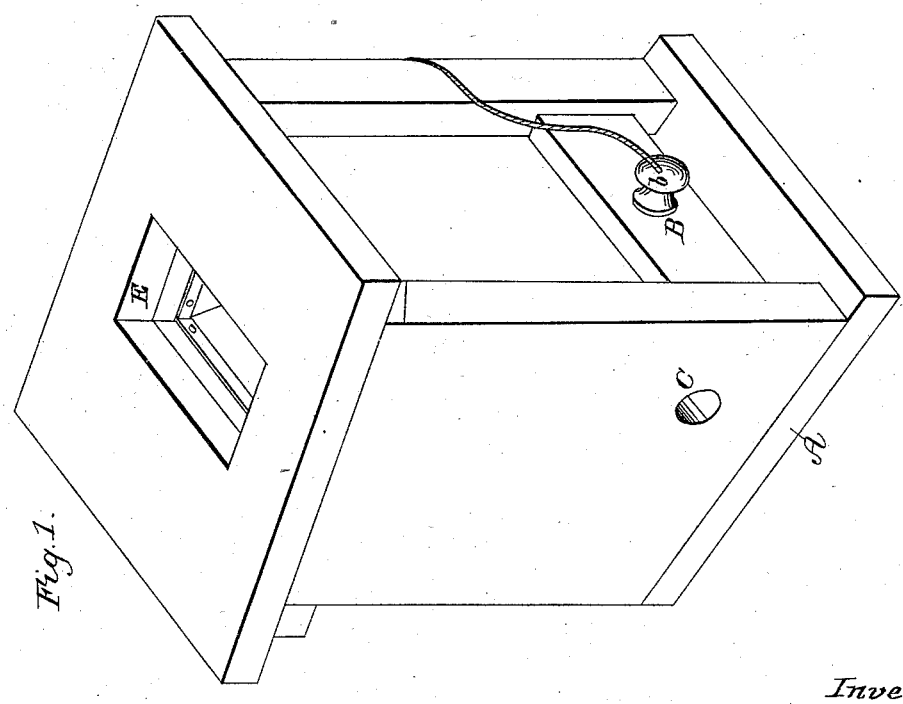
Witnesses
Inventor

UNITED STATES PATENT OFFICE.

DAVID DOUGAL AND WILLIAM TRUXAL, OF BUTLER, PENNSYLVANIA.

IMPROVEMENT IN BEE-HIVES.

Specification forming part of Letters Patent No. 33,189, dated September 3, 1861.

*To all whom it may concern:*

Be it known that we, DAVID DOUGAL and WILLIAM TRUXAL, both of the borough and county of Butler, in the State of Pennsylvania, have invented a new and useful Improvement in Bee-Hives, of which the following is a full, clear, and exact description, reference being had to the accompanying drawings, which make part of this specification, and in which—

Figure 1 represents a view in perspective of our improved apparatus for preventing the destruction of honey-bees by worms, and Fig. 2 represents a vertical longitudinal section through the center of the same.

The object of our invention is to prevent moths or butterflies from entering the hive in order to deposit their eggs, for in the event of their success the worms hatched from the eggs would soon destroy the bees; and to this end our invention consists in attaching a vestibule or entrance to the hive, through which everything going into the hive must pass. This device, which we call a "bee-guard," consists of a box or chamber having perpendicular sides or walls provided with sloping ledges or projections so arranged that in case a moth or fly enters the vestibule and crawls up its sides it would be stopped by the ledges and would deposit the eggs on the under side thereof. When the worms are hatched, their struggles cause them to drop from the ledges and fall to the bottom of the chamber and roll out upon the ground, the bottom being inclined for this purpose.

The accompanying drawings represent a convenient arrangement of parts for carrying out the objects of our invention. In this instance the vestibule consists of a rectangular box, which is intended to be secured underneath the hive. It has a sloping bottom A, which projects slightly beyond the front side of the box in order to form a foot-board, upon which the bees may light. An adjustable sliding door B forms part of the front of the box, and may be held in any required position by the catch *b*. An opening C in each side of the box, covered with wire-gauze, serves as a ventilator when the door is shut. Sloping guards D D, formed in this instance of sheet-tin, are secured to the sides of the box near its upper end, and are closely united at their edges that no moths may pass between them. These guards slope downward at an angle of about sixty degrees. For greater security we place a double row of such guards, and likewise place the opening E, which forms the entrance to the hive, in the center of the top of the box. By this mode of construction, in case the moths or butterflies should effect an entrance to the vestibule, they would crawl up its sides until stopped by the guards, under which they would deposit their eggs. The worms from these eggs when hatched would detach themselves from the guards by their struggles and fall upon the inclined bottom A, down which they would roll to the ground. It will thus be seen that our invention furnishes an effectual protection against the ravages of these insects.

We have shown the chamber as of a rectangular form; but it is obvious that its shape might be varied without departing from the spirit of our invention.

We have likewise described our invention as applied to the bottom of a hive; but it might likewise be applied with equal advantage to the side thereof, it being only necessary in such case to provide a short horizontal passage to connect with the hive and the opening in the top of the box.

What we claim as our invention, and desire to secure by Letters Patent, is—

Attaching to bee-hives a vestibule or entrance provided with guards D D and a sloping bottom A, constructed and arranged as herein described, for the purpose set forth.

In testimony whereof we have hereunto subscribed our names.

DAVID DOUGAL.
WILLIAM TRUXAL.

Witnesses:
G. C. ROESSING,
PETER KEIL.